United States Patent

[11] 3,621,067

| [72] | Inventor | Joseph Warren Hamersma<br>Tustin, Calif. |
|---|---|---|
| [21] | Appl. No. | 844,203 |
| [22] | Filed | July 23, 1969 |
| [45] | Patented | Nov. 16, 1971 |
| [73] | Assignee | Atlantic Richfield Company<br>Philadelphia, Pa. |

[54] VINYL FLUORIDE FROM 1-FLUORO-2-CHLOROETHANE BY PYROLYSIS IN THE PRESENCE OF BROMINE
6 Claims, No Drawings

[52] U.S. Cl. .......................................................... 260/653.5

[51] Int. Cl. ...................................................... C07c 17/34,
C07c 21/18
[50] Field of Search ........................................... 260/653.5

[56] References Cited
FOREIGN PATENTS
635,445  1/1964  Belgium

*Primary Examiner*—Daniel D. Horwitz
*Attorneys*—Robert R. Cochran and Robert J. Mawhinney ABSTRACT: 1-fluoro-2-chloroethane is pyrolized in the presence of bromine to vinyl fluoride. The pyrolysis occurs at 450° C. to 600° C. in bromine to 1-fluoro-2-chloroethane ratios of 1:10,000 to 1:15. $O_2Cl_2$ and $I_2$ react similarly.

VINYL FLUORIDE FROM 1-FLUORO-2-CHLOROETHANE BY PYROLYSIS IN THE PRESENCE OF BROMINE

BACKGROUND OF THE INVENTION

This invention relates to the pyrolysis of 1-fluoro-2-chloroethane to produce the unsaturated monomers, vinyl fluoride. More particularly, this invention relates to a novel process for preparing vinyl fluoride by pyrolysis of 1-fluoro-2-chloroethane in the presence of bromine.

Description of the Prior Art

Vinyl fluoride is a known and valuable monomer for producing plastics useful in many applications. See, for example, V. L. Simirill and B. A. Currie, Journal of Applied Polymer Science, Vol. IV, 62–68 (1960) and Chemical Engineering, Vol. 71, pp. 90–91 (1964). Several copolymers of vinyl fluoride have been described, see for example, Journal of American Chemical Society, Vol. 86, pp. 460–63 (1964), Chemistry and Industry, Nov. 27, 1965, p. 1976 and Journal of Polymer Science, A–3, p. 4,263 (1965).

Vinyl fluoride has been produced by a variety of processes including the thermal dehydrochlorination of 1-chloro-1-fluoroethane, U.S. Pat. Nos. 3,200,160 and 3,414,627, passing a gaseous mixture of HF and acetylene over a cadmium containing catalyst, U.S. Pat. No. 3,413,361. Thomas, U.S. Pat. No. 2,673,884 describes a process for preparing 1-fluoro-2-chloroethane and refers to the dehydrohalogenation of this compound to vinyl fluoride over lime, soda lime, limestone, etc. Vinyl chloride is conventionally produced by pyrolysis of 1,2-dichloroethane, see, e.g., Chemical Engineering, Apr. 10, 1967, pp. 219–26.

Conventional pyrolysis concepts, when applied to the production of vinyl fluoride, and homologs, from 1-fluoro-2-chloroethane, and homologs, was successful but the yields and specificity to the desired fluorine containing unsaturated monemeric compound, vinyl fluoride for example, was low. I have now provided a process for producing vinyl fluoride, and homologs, in improved yield and with unexpectedly high specificity.

SUMMARY OF THE INVENTION

According to the present invention, 1-fluoro-2-chloroethane is pyrolyzed in the presence of bromine to produce the analogous fluorine containing monomer with high specificity. Pyrolysis temperatures may be from about 450° C. to about 600° C. and residence times may be from about 0.01 seconds to about 100 seconds. The ratio of bromine to the unsaturated fluorine containing compound may be from about 1:10,000 to about 1:5.

It is, accordingly, an object of this invention to provide an improved process for producing unsaturated fluorine containing monomers by the pyrolysis of fluorine containing saturated compounds.

A still more specific object of the invention is to provide an improved process for producing vinyl fluoride by the pyrolysis of 1-fluoro-2-chloroethane in the presence of bromine.

The specific pyrolysis conditions constitute additional more specific nonlimiting objects of the invention.

Other objects of the invention will be apparent from the specification.

DESCRIPTION OF THE PREFERRED EMBODIMENTS

According to the present invention useful fluorine containing monomers are produced by the pyrolysis of 1-fluoro-2-chloroethane in the presence of bromine to increase the yield of the fluorine containing monomer and significantly to improve the specificity to the desired fluorine containing monomer. Precursors of the indicated formula may be prepared by a variety of methods. One highly efficient method is described by Caserio and Hamersma, CHLOROFLUORINATION OF OLEFINS, patent application, Ser. No. 844,118, filed concurrently herewith.

Vinyl fluoride is of particular interest and the process will be described, for convenience, in terms of the pyrolysis of 1-fluoro-2-chloroethane in the presence of bromine to produce vinyl fluoride.

The process of this invention is preferably carried out in a hot tube reactor, which may be of the type described in U.S. Pat. No. 2,724,006, using the general principles referred to by Albright, Chemical Engineering, Apr. 10, 1967, pp. 219–226.

The reaction may be carried out successfully in the temperature range of about 450° C. to about 600° C. The preferred temperature range, however, is from about 500° C. to about 600° C. with best yields and selectivities resulting from operation above 525° C. and up to roughly 575° C. Optimum temperature is somewhat dependent upon reactor design and upon the ratio of, e.g., bromine (Br) to ethylene fluorochloride (EFC). Generally, less Br is required to provide optimum conversion and specificity at higher temperatures.

Residence or contact time in the reactor is also somewhat dependent upon Br–EFC ratios and is dependent upon reactor temperature. At temperatures approaching 600° C., the residence time for optimum conversion and specificity is generally in the range of about 1 to 4 seconds. In the temperature range of 500°–550° C., however, residence times of 5–8 or 10 seconds gives optimum conversion and specificity. Longer residence times are desirable with low EDC–EFC ratios. While these are optimum residence or contact times, under the conditions in which this invention has been practiced in the laboratory, the process may be carried out with residence times greatly above and below these figures. For example, residence times from 0.01 to about 100 seconds may be used, although the commercially feasible range of residence times is believed to be in the range of from about 0.1 seconds to about 10 seconds.

The essential novelty of the inventive process resides in the use of a mixture of bromine with the fluorochloralkane which is to be cracked. This mixture, i.e., formed by the addition of bromine to the fluorine containing compound, results in improved yield and in a highly unexpected improvement in specificity of the reaction to the fluorine containing unsaturated monomer, vinyl fluoride. Since the vinyl fluoride monomer is several times more valuable than the vinyl chloride monomer, which can be produced cheaply by several processes, the importance of a reaction which is highly selective to the hydrodechlorination, rather than hydrodefluorination, will be readily apparent.

The bromine-fluorochloroethane ratio (Br–EFC ratio) may be from about 1:10,000 to about 1:15. The Br–EFC ratio of 1:1000 to 1:30 is preferred and highly unexpected specificity to the fluorine containing compound has been obtained using BR–EFC ratios of from about 1:50. Optimum ratios, as previously indicated, depend upon the reactor design and temperature, which factors may be limited to some degree by ancillary considerations. Obviously, optimum Br–EFC ratios should be determined with proper consideration for other reaction variables but will fall generally in the range of 1:1000 to 1:30.

Bromine is exemplary of easily split diatomic compounds useful in this process. Chlorine, iodine and oxygen, being identical in the essential feature (easily broken diatomic bonding), are included in this invention as being equivalent to bromine. Bromine, however is more easily handled.

A suitable laboratory apparatus for carrying out the reaction of this invention is described as follows. The reactor is suitably a tube surrounded by a heater with appropriate temperature control devices. Means are provided to the inlet of the tubular reactor for injecting helium, as a carrier, at any desired rate, such as from 0.01 to 100 volumes per reactor volume. EFC is injected into the helium stream by a motor-driven syringe. Bromine may be injected separately into the helium stream, as by a motor-driven syringe, but for experimental simplicity and for reasons discussed in greater detail hereinafter, the bromine is preferably premixed with the fluorochloroethane and injected therewith. The mixture is stored in the dark until it enters the reactor.

The tubular reactor may be packed, with catalytic or non-catalytic material, or used in the unpacked condition. Effluent from the reactor is passed through an ice trap to trap remaining reactant, a trap for HCl, such as a NaOH trap, to a liquid nitrogen trap for recovery of the unsaturated monomeric material. Separation of the reactant materials may be by fractionation or other conventional chemical separation technique.

During initial investigations, several catalysts at varying temperatures were screened. The catalyst materials screened included calcium oxide, Pyrex wool, Pyrex beads, Alundum, silica gel and gamma alumina. It became apparent that, with the exception of gamma alumina, the catalyst had a neutral or slightly negative effect on the selectivity of the reaction to vinyl fluoride. It was noticed that the selectivities tended toward a maximum of 85 percent and were the highest when the conversions and/or temperatures were the highest. From the results obtained in the early experiments it was concluded that the reaction was pyrolytic rather than catalytic dehydrohalogenation.

Careful experiment runs using glass beads in the reactor tube to provide a hot contact surface for heat transfer showed that in the temperature range of greatest interest, from about 500° to about 550° or 560° C., using a residence time of 5 seconds, selectivity to vinyl fluoride was about 75 percent with conversions of about 3 percent. These results are summarized in the following table.

TABLE I

PROLYSIS OF CHLOROFLUORETHANE

| Temperature | Selectivity ViF | % Conversion |
|---|---|---|
| 507 | 72 | 3 |
| 517 | 75 | 3 |
| 527 | 72 | 3 |
| 540 | 72 | 3 |
| 555 | 72 | 3 |

Similar experiments using bromine in a 1:50 weight ratio with respect to 1-fluoro-2-chloroethane, in the temperature range of 507° to 555° C., with contact times in the 4–5 second range, gave essentially 100 percent selectivity to vinyl fluoride with yields up to about 15 percent. Only traces of vinyl chloride were detectable. These experiments were carried out in a hot unpacked tube maintained at the desired temperature.

The process of this invention, therefore, gives an unexpectedly high synergistic improvement in yield and selectivity. The monomeric products from the reaction are easily separated, if necessary, by distillation, for producing valuable vinyl fluoride polymers according to known polymerization processes.

It has previously been indicated that the reaction may be carried out over catalytic materials; however, this reaction is pyrolytic and the presence of certain catalysts may be slightly detrimental. Acidic and basic catalysts, in particular, tend to be detrimental to the process of this invention. It may be desirable to include catalytic materials in the reactor for purposes other than conversion of EFC but, in general, the reaction is best carried out in unpacked tubes or in tubes packed with materials catalytically inert to the reaction of interest.

As the foregoing clearly indicates, a novel process for preparing unsaturated fluorine containing monomeric materials, vinyl fluoride in particular, with unexpectedly high yields and surprisingly synergistic effects upon specificity has been described. It is expected that one skilled in this art will be able to make certain modifications of the process variables based upon the foregoing teachings without departing from the spirit and scope of the claims which follow.

I claim:
1. In a process for producing vinyl fluoride by the pyrolysis of 1-fluoro-2-chloroethane at temperatures of from about 450° C. to about 600° C., and residence times of from about 0.01 to about 100 seconds, the improvement wherein said 1-fluoro-2-chloroethane is pyrolytically converted to vinyl fluoride in the presence of bromine in the weight ratio of from about 1:10,000 to about 1:15 parts of bromine per part of said 1-fluoro-2-chloroethane.

2. The process of claim 1 wherein the temperature is from about 500° C. to about 600° C.

3. The process of claim 2 wherein the residence time is from about 1 second to about 10 seconds.

4. The process of claim 1 wherein the residence time is from about 1 second to about 10 seconds.

5. The process of claim 1 wherein the ratio of bromine to 1-fluoro-2-chloroethane is from about 1:1,000 to about 1:30.

6. The process of claim 5 wherein the temperature is from about 500° C. to about 600° C. and the residence time is from about 1 to about 10 seconds.

* * * * *